(12) United States Patent
Guggolz et al.

(10) Patent No.: US 8,347,749 B2
(45) Date of Patent: Jan. 8, 2013

(54) GEARSHIFT DEVICE

(75) Inventors: Manfred Guggolz, Leonburg-Gebersheim (DE); Werner Hillenbrand, Neuffen (DE); Jürgen Hertlein, Weinstadt (DE); David Ulmer, Filderstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/200,519

(22) Filed: Sep. 23, 2011

(65) Prior Publication Data

US 2012/0260757 A1 Oct. 18, 2012

Related U.S. Application Data

(63) Continuation-in-part of application No. PCT/EP2010/001272, filed on Mar. 2, 2010.

(51) Int. Cl.
*B60W 10/02* (2006.01)

(52) U.S. Cl. .................. 74/335; 477/79; 477/174

(58) Field of Classification Search ........... 477/70, 477/71, 79, 86, 174; 74/335
See application file for complete search history.

(56) References Cited

U.S. PATENT DOCUMENTS

| | | | |
|---|---|---|---|
| 5,389,053 A * | 2/1995 | Steeby et al. | 477/123 |
| 5,408,895 A * | 4/1995 | Chan et al. | 74/335 |
| 2002/0137596 A1 * | 9/2002 | Markyvech | 477/83 |
| 2002/0137597 A1 * | 9/2002 | Genise et al. | 477/107 |
| 2004/0118652 A1 * | 6/2004 | Muetzel et al. | 192/3.55 |
| 2010/0041513 A1 * | 2/2010 | Doebele et al. | 477/75 |

FOREIGN PATENT DOCUMENTS

| | | |
|---|---|---|
| EP | 1 150 042 | 10/2001 |
| EP | 1 669 270 | 6/2006 |
| GB | 2 311 105 | 9/1997 |
| WO | WO 03/059679 | 7/2003 |

\* cited by examiner

*Primary Examiner* — Ha D. Ho
(74) *Attorney, Agent, or Firm* — Klaus J. Bach

(57) ABSTRACT

In a gear shift device and a method for operating a manual gearshift device of a motor vehicle including a control unit which, in a gear shift mode is adapted to resolve a recognized tooth butt condition of a gear shift device which is to be engaged positively by a starting clutch, the control unit is adapted to select a starting mode for resolving the tooth butt condition by setting a startup readiness parameter which determines a startup readiness condition as established before the tooth butt condition is resolved for initiating clutch engagement and thereby resolving the tooth butt condition and, at the same time, starting movement of the vehicle.

13 Claims, 1 Drawing Sheet

GEARSHIFT DEVICE

This is a Continuation-In-Part application of pending international patent application PCT/EP2010/001272 filed Mar. 2, 2010 and claiming the priority of German patent application 10 2009 016 440.5 filed Apr. 4, 2010.

BACKGROUND OF THE INVENTION

The invention relates to a gearshift device with a control unit for resolving a recognized tooth butt conditions of a gear shift arrangement so as to permit positive gear engagement before the activation of the starting clutch.

A gearshift device is already known from U.S. Pat. No. 6,769,523 B2 which comprises a control unit which, at least in a gearshift mode, is provided for resolving a recognized tooth butt condition of a gearshift means which shifts in a positive manner by means of a starting clutch and which, at least in a starting mode, is provided for complete actuation of the starting clutch.

EP 1 669 270 A2 describes a gearshift device with a control unit for a motor vehicle. When the motor vehicle is in a stopped state, the control unit sets a starting clutch into a defined intermediate position, in order thus to resolve a tooth butt condition.

WO 03/059679 A1 describes a gearshift device with a control unit and a centrifugal clutch for a motor vehicle. In the case of a recognized tooth butt condition of a gearshift means which shifts in a positive manner, the control and/or regulating unit increases a rotational speed of a drive engine of the motor vehicle. Owing to the increased rotational speed, the centrifugal clutch transmits a torque to the gearshift device, this being intended to resolve the tooth butt condition. If this is not successful at the first attempt, optionally further attempts are made.

It is the principal object of the invention to provide a gearshift device which provides for a rapid and comfortable resolving of a tooth butt condition to permit shifting into a desired gear.

SUMMARY OF THE INVENTION

In a gear shift device and a method for operating a manual gearshift device of a motor vehicle including a control unit which, in a gear shift mode is adapted to resolve a recognized tooth butt condition of a gear shift device which is to be engaged positively by a starting clutch, the control unit is adapted to select a starting mode for resolving the tooth butt condition by setting a startup readiness parameter which determines a startup readiness condition as established before the tooth butt condition is resolved for initiating clutch engagement and thereby resolving the tooth butt condition and, at the same time, starting movement of the vehicle.

This means that a rapid and comfortable resolving of the tooth butt condition can be achieved, since a controlled closing of the starting clutch during the starting mode can advantageously be used for turning the gearshift means and hence for resolving the tooth butt condition. Because the control unit selects the starting mode before the tooth butt condition is resolved, a time-consuming overcoming of the tooth butt condition, for example by partially closing and subsequently re-opening the starting clutch, can be avoided, which means that a startup operation in which the tooth butt condition has been recognized can be speeded up.

A "starting mode" is to be understood to mean in this case in particular an operating mode which is provided for transmitting a drive torque from a drive engine to drive wheels by gradually engaging a drive train arranged between the drive engine and the drive wheels. The starting mode in this case should in particular permit starting-up of a motor vehicle from a stopped state. "Gradual closing of the starting clutch" is further to be understood to mean in particular continuous closing of the starting clutch, in which a torque transmitted by the starting clutch continuously increases until the starting clutch is completely closed.

Further, a "gearshift mode" is to be understood to mean in particular an operating mode which for the formation of a gear engagement is provided for shifting gearshift means of a manual transmission of the drive train into its shift positions according to a switching logic stored in the control unit. "Resolving of a tooth butt condition" is to be understood to mean in this case in particular that the control and/or regulating unit is provided for overcoming the tooth butt condition by means of turning of the gearshift means and then completely shifting the gearshift means in positive manner.

A "control unit" is to be understood to mean in particular a processor with a memory unit and an operating program stored in the memory. "Provided" is to be understood to mean in particular specially programmed, equipped and/or designed. Further, "actuation of the starting clutch by means of the control unit" and also analogously "shifting of the gearshift means by means of the control and/or regulating unit" here and below are to be understood to mean that the gearshift device has actuators which are adjustable by means of the control unit, which are provided for actuating the starting clutch and/or for shifting the gearshift means.

According to the invention, the control unit is provided for setting a startup readiness parameter which describes a startup readiness condition as established before the tooth butt condition is resolved. This means that the control unit can inform a driver of the motor vehicle and/or further control units which communicate with the first control unit that the manual transmission has been shifted faultlessly, which means that the startup operation can be carried out. "Establishing a startup readiness condition" is to be understood to mean in this case in particular that a readiness condition for closing the starting clutch is established, for example by releasing an actuator associated with the starting clutch.

"Setting a startup readiness parameter" is further to be understood to mean in particular that a virtual and/or really existing parameter which describes a state of startup readiness is set to a value which corresponds to an actually existing startup readiness condition. A "virtual parameter" is to be understood to mean in this case in particular a parameter which can be defined using really set parameters and/or status variables of definable parameters, the realization of which, for example in the form of a CAN bus parameter, has been dispensed with. A "really existing parameter" is to be understood to mean in particular a parameter which can be determined electrically and/or electronically, such as for example a control signal and/or a program parameter.

Further, it is proposed that the control unit is capable of selecting the starting mode before the tooth butt condition is resolved, and for closing the starting clutch gradually completely in order to resolve the tooth butt condition. This means that the starting mode can be used particularly advantageously for resolving the tooth butt condition. "Selecting of the starting mode" is to be understood to mean in this case in particular that the control unit selects an operating mode which corresponds substantially to a starting mode for starting up the motor vehicle from a stopped state in the case of a manual transmission which has been shifted faultlessly.

In a particularly advantageous embodiment, the control unit is adapted to set a gear indicator parameter which describes a starting gear to be selected as shifted faultlessly, before the recognized tooth butt condition is resolved. This means that in particular the driver can be informed in particularly simple manner that the startup readiness condition exists, which means that the driver can initiate the startup operation and hence the tooth butt condition is resolved.

Further, it is proposed that the control unit, after recognition of a tooth butt condition, closes the starting clutch completely dependent on a driver parameter. This means that the driver can initiate and implement the startup operation without a time delay which is perceptible to the driver occurring due to the resolving of the tooth butt condition. The "driver parameter" is to be understood to mean in this case a parameter which can be set by the driver, such as for example an actuating position of a gas pedal and/or an actuating position of a clutch pedal.

It is particularly advantageous if the control unit is provided for setting at least at times an actuating force for the gearshift means in the starting mode. This means that resolving of the tooth butt condition and subsequent positive shifting of the gearshift means can largely be achieved, which means that a reliable startup operation can be achieved. In principle, the actuating force can be built up once for shifting of the gearshift means and then remain built up until the tooth butt condition is resolved or the resolving process is discontinued. It is however likewise conceivable initially to build up the actuating force for shifting the gearshift means, and then to build it up again after recognition of the tooth butt condition.

Advantageously, the control unit sets the actuating force for the gearshift means while the starting clutch is being gradually closed. This means that in the case of a recognized tooth butt condition a particularly reliable startup operation can be obtained.

Since the control unit preferably closes a drive train in non-positive manner by means of a complete closing of the starting clutch, the startup operation can advantageously be concluded during the closing procedure of the starting clutch and at the same time the tooth butt condition can be overcome.

In a particularly advantageous embodiment, the control unit, for overcoming the tooth butt condition, has a starting clutch closure characteristic which deviates from a starting clutch closure characteristic for a starting gear which is shifted faultlessly. This means that the resolving of the tooth butt condition can be switched particularly comfortably. A "starting gear which is shifted faultlessly" is to be understood to mean in this case in particular that the gearshift means associated with the starting gear have been shifted faultlessly into their shift positions. In particular, this should be understood to mean that the control unit has not recognized any, that is there is no, tooth butt condition.

In a further embodiment, the control unit selects in the starting mode a neutral transmission position dependent on an error parameter. As a result, an unsuccessful resolving of the tooth butt condition can advantageously be avoided. An "error parameter" is to be understood to mean in this case in particular a parameter which is set if the control unit, after a defined amount of time, continues to recognize a tooth butt condition, i.e. the tooth butt condition has not been eliminated within the defined amount of time. As amount of time for example an amount of time normally required for a complete closing of the starting clutch, is considered to be appropriate in this case. Further, feedback to the driver can take place in simple manner by means of the selection of the neutral transmission position, in that the selection of the neutral transmission position is signaled to the driver via a corresponding gear display parameter.

Preferably the control unit is further provided for determining a starting movement parameter. This means that, for resolving the tooth butt condition, the control unit can advantageously take a motor vehicle starting movement into consideration.

In particular, it is advantageous if the control unit is provided for determining an inclination parameter in order to determine the roll start movement parameter. This means that external forces, such as in particular grade resistance, can advantageously be utilized. In particular, this means that a roll start inclination of the motor vehicle can be determined while the motor vehicle is still in a stopped state, which means that the startup operation can be matched to the roll start inclination.

Furthermore, it is proposed that the control unit, for resolving the tooth butt condition, be provided in the starting mode for setting and/or for determining a state of a braking and/or parking system. In this way, unintentional moving of the motor vehicle before the resolution of a tooth butt condition can be prevented. The startup operation can be made particularly comfortable as a result. It is particularly advantageous if the control unit controls the braking and/or parking unit dependent on an inclination parameter, which means that unnecessary actuation of the braking and/or parking unit, for example on a level surface, can be avoided. A "braking and/or parking unit" is to be understood to mean in this case in particular a unit which is provided for suppressing rolling of the motor vehicle, such as for example a unit with a service brake, a parking brake and/or an anti-rollback device.

The invention will become more readily apparent from the following description of an exemplary embodiment thereof with reference to the accompanying drawings.

DESCRIPTION OF AN EXEMPLARY EMBODIMENT

Figure 1:
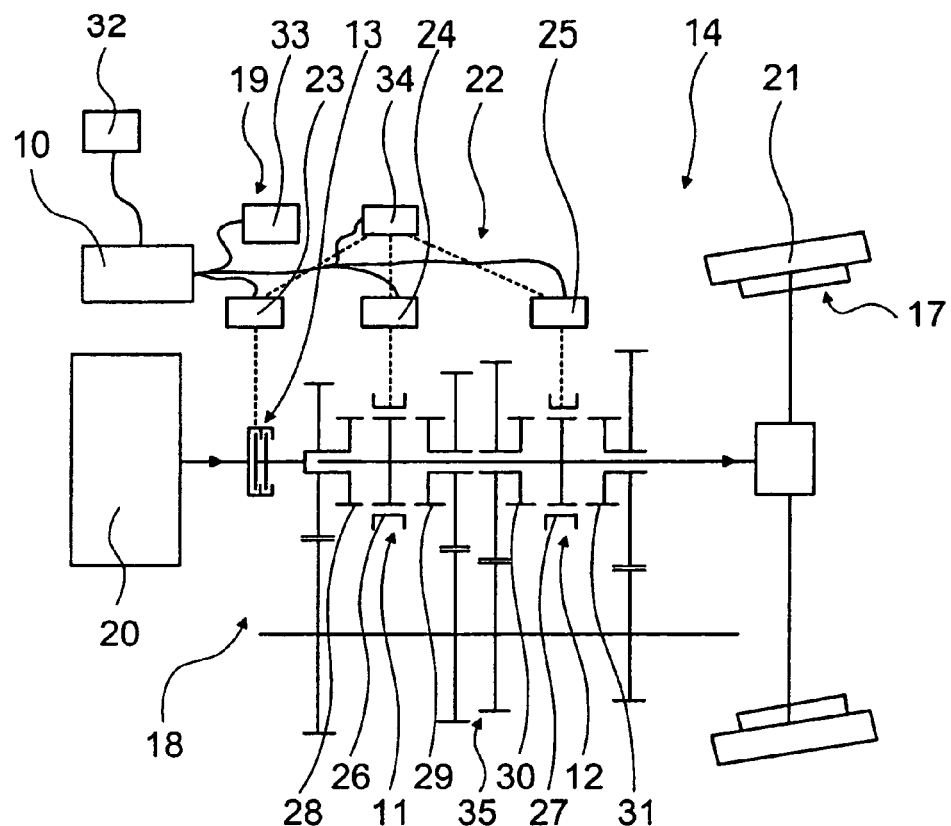
FIG. 1 shows diagrammatically a drive train of a motor vehicle with a gearshift device according to the invention.

FIG. 1 shows diagrammatically a drive train 14 of a motor vehicle. The drive train 14 is provided for connecting a drive engine 20, such as for example an internal combustion engine, in non-positive manner to drive wheels 21 of the motor vehicle. For establishing the non-positive connection, the drive train 14 has a motor vehicle drive train device 22 with a starting clutch 13 and a manual transmission 18. FIG. 1 shows the starting clutch 13 and the manual transmission 18 arranged in a power train, one arranged after the other. In principle it is however also conceivable to integrate the starting clutch 13 in the manual transmission 18.

The starting clutch 13 and the manual transmission 18 are automated. In order to actuate the starting clutch 13 and to shift the manual transmission 18, the motor vehicle drive train device 22 has a gearshift device 19. The gearshift device 19 comprises actuators 23, 24, 25 for providing actuating forces for the starting clutch 13 and gearshift means 11, 12. For controlling the actuating forces of the actuators 23, 24, 25, the gearshift device further comprises, in addition to the control unit 10, a sensor unit 34 for determining the shift positions of the actuators 23, 24, 25.

The actuators 23, 24, 25 are pressure-controlled. The motor vehicle drive train device 22 has an operating medium pressure source, not shown, by means of which a pressurized operating medium for switching the actuators 23, 24, 25 is provided. The control unit 10 is provided for actuating switching valves, not shown, by means of which valves a pressure distribution to the individual actuators 23, 24, 25 is set. The operating medium pressure source and also the actuators 23, 24, 25 are provided for a pneumatic pressure source in this exemplary of embodiment. In principle, however, a hydraulic actuation is also conceivable.

To shift gears, the manual transmission 18 has a set of gear wheels 35. To produce rotational connections in the set of gear wheels 35, the manual transmission has the gearshift means 11, 12 which are at least partially formed as ones which shift in positive manner. The gearshift means 11, 12 have in each case a sliding sleeve 26, 27 which is axially displaceable along a shifting direction, and which is provided for a positive connection with at least one corresponding gearshift element 28, 29, 30, 31. The sliding sleeve 26, 27 and the at least one gearshift element 28, 29, 30, 31 have in each case a set of shift claws or teeth which are brought into positive engagement with each other upon shifting.

The actuators 23, 24, 25 which are adjustable by means of the control unit 10 are coupled to the gearshift means 11, 12 and the starting clutch 13. In order to change gears, i.e. in order to change rotation-resistant connections in the manual transmission 18, the control unit 10 has a gearshift mode in which, dependent on a switching logic stored in the control unit 10, the actuators 24, 25 associated with the gearshift means 11, 12 are shifted into shift positions or into neutral positions. For the non-positive closing of the drive train 14, the control unit 10 has a starting mode in which the control unit 10, in particular for the actuator 23 which is associated with the starting clutch 13, sets an actuating force greater than zero for gradually completely closing the starting clutch 13.

In order, starting with a stopped state of the vehicle and a neutral transmission position, to shift into a driving mode, the control unit 10 by means of the gearshift mode initially forms a starting gear engagement and then activates the starting clutch 13 by means of the starting mode. To form the starting engagement, the control unit 10 shifts at least one of the gearshift means 11, 12 which shift in positive manner by setting, at least at times, an actuating force greater than zero for the corresponding actuator 24, 25.

In the case of a faultless shifting operation for forming the starting gear, all the gearshift means 30, 31 which shift in positive manner shift into their shift positions, which establishes a startup readiness condition. By means of the sensor unit 34, the control unit 10 recognizes the starting gear which has been shifted faultlessly and sets a startup readiness parameter which describes the startup readiness condition as established. Dependent on the startup readiness parameter, then a display unit 32 is activated which signals the startup readiness condition to a driver. As soon as the driver actuates a gas pedal, the control unit 10 closes the starting clutch 13 gradually, which means that the drive train is connected in non-positive manner and thus the driving mode is selected.

In defined phase positions between the sliding sleeve 26, 27 and the corresponding shifting element 28, 29, 30, 31, shifting of the gearshift means 11, 12 in a positive manner into the desired shift position is prevented. In these phase positions, the sets of teeth of the gearshift means 11, 12 are in a tooth butt condition relative to each other, which prevents movement of the corresponding actuator 24, 25 into the shift position. The control unit 10 establishes such a tooth butt condition by means of the sensor unit 34. The control and regulating unit 10 recognizes the presence of a tooth butt condition by the actuator 24, 25 remaining for a defined amount of time in an intermediate position between a neutral position and the shift position. In order to resolve the tooth butt condition, the control and regulating unit 10 uses the starting mode which is provided for complete gradual closing of the starting clutch 13 when the starting gear is selected.

To form the starting gear starting from the neutral transmission position, the control unit 10, in the expectation of a faultless shifting operation, initially attempts, by means of the gearshift mode, to select the preselected starting gear. The starting gear can be specified by the control unit 10 and/or by the driver. To form the starting gear, the control unit 10 sets an actuating force for the actuators 24, 25 associated with the corresponding gearshift means 11, 12 for shifting the gearshift means 11, 12. If the control and regulating unit 10 in the gearshift mode recognizes a tooth butt condition, it shifts into the startup operation mode even before the tooth butt condition is resolved.

For shifting into the startup operation mode in the case of an existing tooth butt condition, the control and regulating unit 10 sets the startup readiness parameter, which means that the startup readiness condition is set as established. Due to the startup readiness parameter, the control unit 10 sets a gear indicator parameter, on the basis of which the display unit 32 signals to the driver that the starting gear is selected. By setting the startup readiness parameter, it is signaled to the driver that the startup readiness condition has been established.

When the startup readiness condition has been established, the control unit 10 expects an intention to start from the driver. As soon as the intention to start, which may for example be expressed in the form of actuation of the gas pedal, is indicated, the control unit 10 closes the starting clutch 13 gradually until it is completely closed. At the same time, the control unit 10 sets an actuating force for complete shifting of the gearshift means 11, 12 for the actuator 24, 25 which is associated with the gearshift means 11, 12, which is still in the tooth butt condition. The control unit 10 sets an actuating force by means of the corresponding actuator 24, 25 as soon as the driver transmits his intention to start by actuating the gas pedal. In principle, the actuating force can initially be reduced and built up again immediately after the shifting if the driver actuates the gas pedal. It is however also conceivable to maintain the actuating force after the selection of the starting gear and recognition of the tooth butt condition until the starting clutch is completely closed.

While the starting clutch 13 is being closed, a torque is transmitted to the part of the gearshift means 11, 12 which is coupled to the starting clutch 13, by which torque this part of the gearshift means 11, 12 is turned. The starting clutch 13 can in principle be coupled with the sliding sleeve 26, 27 or the corresponding gearshift element 28, 29, 30, 31. The tooth butt condition is overcome by the turning of the gear in the respective gearshift means 11, 12. Due to the actuating force for the gearshift means 11, 12 which acts simultaneously with the closing of the starting clutch 13, the gearshift means 11, 12 is moved completely into its shift position.

Figure 2:
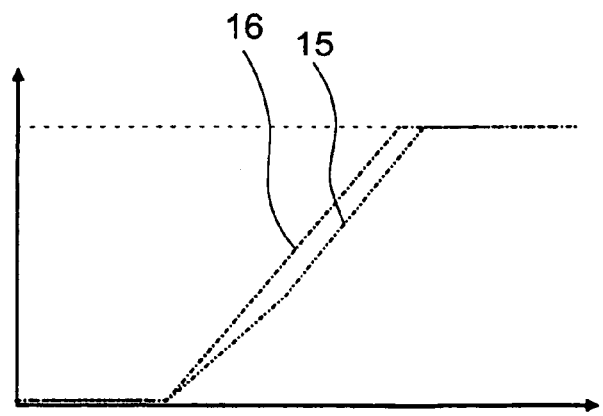
FIG. 2 shows different starting clutch closure characteristics for a starting clutch of the drive train in a diagrammatic representation.

With the shifting of the gearshift means 11, 12 the starting gear is also completely formed. The starting clutch 13 is gradually further closed following the resolving of the tooth butt condition. The closing of the starting clutch 13 thus overcomes the tooth butt condition and closes the drive train 14 in non-positive manner. A starting clutch closure characteristic 15 which describes a path of the actuating force for the starting clutch 13 and which is set by the control and regulating unit 10 if the gearshift means 11, 12 is in a tooth butt condition differs from a starting clutch closure characteristic 16 which is established in the case of a starting gear which is shifted faultlessly (cf. FIG. 2).

The control unit 10 monitors the shifting operation of the gearshift means 11, 12 during the closing of the starting clutch 13. If during the complete closing of the starting clutch 13 an error is recognized in the resolving of the tooth butt condition, such as for example a non-resolved tooth butt condition when the starting clutch 13 is completely closed, the control unit 10 sets an error parameter. Dependent on the error parameter, the control unit 10 shifts the manual transmission 18 into the neutral transmission position by releasing the non-positive connection of the drive train 14 by means of the manual transmission 18. The control unit 10 signals to the driver that the neutral transmission position is selected via the gear indicator parameter. Further signaling means, such as for example an optical and/or acoustic error indicator, are likewise conceivable.

The resolving of the tooth butt condition by means of the starting mode is provided for a startup operation from a stopped state of the vehicle. In order to prevent the motor vehicle from starting to roll during the resolving of the tooth butt condition, the motor vehicle has a braking and parking unit 17 provided for the drive train 14, which unit can be actuated by means of the control unit 10. To trigger the braking and parking unit 17, the control unit is provided for evaluating a roll start parameter. For determining the roll start parameter, which describes an external roll start force acting on the motor vehicle, the gearshift device 19 has an inclination sensor 33 which is evaluated by the control and regulating unit 10.

By means of the inclination sensor 33, the control and regulating unit 10 determines a roadway inclination parameter which is used for determining the roll start parameter. Dependent on the inclination of the roadway, the control unit 10 activates the braking and parking unit 17 or checks actuation of the braking and parking unit 17. If the inclination of the roadway for example has an absolute value of greater than 1%, the control unit 10 actuates the braking and parking unit 17 and thus prevents the motor vehicle from starting to roll before the drive train 14 is closed in non-positive manner. The braking and parking unit 17 has a service brake, a parking brake and an anti-rollback device which can each be monitored or actuated individually by the control unit 10.

What is claimed is:

1. A gearshift device for a gear shift transmission of a motor vehicle, including gear sets and gear shift means (11, 12), a starting clutch (13) and a control unit (10), which, at least in a gearshift mode, is provided for resolving a recognized tooth butt condition of at least one of the gearshift means (11, 12) which shifts in a positive manner by means of the starting clutch (13), and which, at least in a starting mode, is provided for complete actuation of the starting clutch (13), the control unit (10) being provided for selecting the starting mode for resolving the tooth butt condition by generating, in case a tooth but condition is determined, a startup readiness parameter which describes a startup readiness condition as established before the tooth butt condition is actually resolved.

2. The gearshift device as claimed in claim 1, wherein the control unit (10), which selects the starting mode before the tooth butt condition is resolved, provides for closing the starting clutch (13) gradually for resolving the tooth butt condition and then completely closing the starting clutch (13) in a one-step procedure.

3. The gearshift device as claimed in claim 1, wherein, before the recognized tooth butt condition is resolved, the control unit (10) provides for setting a gear indicator parameter which describes a starting gear which is to be selected as shifted faultlessly.

4. The gearshift device as claimed in claim 1, wherein the control unit (10), after recognition of the tooth butt condition, is provided for closing the starting clutch (13) dependent on a driver parameter.

5. The gearshift device as claimed in claim 1, wherein the control unit (10) is provided for setting in the starting mode, at least at times, a predetermined actuating force for the gearshift means (11, 12).

6. The gearshift device as claimed in claim 5, wherein the control unit (10) is provided for setting the actuating force for the gearshift means (11, 12) while the starting clutch (13) is being gradually closed.

7. The gearshift device as claimed in claim 6, wherein the control unit (10) is provided for positively connecting a drive train (14) by the complete closing of the starting clutch (13).

8. The gearshift device as claimed in claim 1, wherein, for overcoming a tooth butt condition, the control unit (10) has a starting clutch closure characteristic (15) which deviates from a starting clutch closure characteristic (16) for a starting gear which has already been shifted faultlessly.

9. The gearshift device as claimed in claim 1, wherein, in the starting mode, dependent on an error parameter, the control unit (10) is provided for shifting into a neutral transmission position.

10. The gearshift device as claimed in claim 1, wherein the control unit (10) includes means for determining a roll start parameter.

11. The gearshift device as claimed in claim 10, wherein the control unit (10) includes means for determining an inclination parameter in order to determine the roll start parameter.

12. The gearshift device as claimed in claim 1, wherein, for resolving the tooth butt condition, the control unit (10) is provided in the starting mode for setting and for determining the state of a braking or parking unit (17).

13. A method for operating a gearshift device of a vehicle, including shift gear sets, gear shift means (11, 12), a starting clutch (13) and a control unit (10), said method comprising the steps of
actuating a starting clutch (13) initially in slipping manner for resolving a recognized tooth butt condition of the gearshift means (11, 12),
setting a startup readiness parameter which describes a startup readiness condition as established before the tooth butt condition is resolved,
and,
with a starting mode being selected, closing the starting clutch (13) for resolving the tooth butt condition and, at the same time, initiating movement of the vehicle.

* * * * *